United States Patent [19]
Missenard

[11] 4,171,942
[45] Oct. 23, 1979

[54] CALENDERING INSTALLATION FOR THERMOPLASTIC SHEETS

[76] Inventor: Pierre Missenard, 95270 Viarmes, France

[21] Appl. No.: 954,686

[22] Filed: Oct. 25, 1978

[30] Foreign Application Priority Data

Nov. 7, 1977 [FR] France .................... 77 33463

[51] Int. Cl.² ............................................. B29D 7/02
[52] U.S. Cl. .................................... 425/367; 425/363; 425/366
[58] Field of Search .................... 425/367, 366, 363

[56] References Cited

U.S. PATENT DOCUMENTS

| | | | |
|---|---|---|---|
| 1,783,263 | 12/1930 | Schnuck | 425/366 |
| 2,525,744 | 10/1950 | Willshaw | 425/366 |
| 3,273,199 | 9/1966 | Kleinewefers | 425/367 |
| 4,117,054 | 9/1978 | Salo | 425/367 |

*Primary Examiner*—William E. Schulz
*Attorney, Agent, or Firm*—Karl W. Flocks

[57] ABSTRACT

A calendering installation for the production of thermoplastic sheets of uniform thickness, comprises at least three active calendering rolls, whose axles of rotation are substantially in the same plane. The diameters of the rolls are different, the diameter of the lower roll being greater than the diameter of each of the two others, and the diameter of the upper roll being greater than the diameter of the central roll. The rolls are formed of materials having different moduli of elasticity, the modulus of elasticity of the upper roll being greater than that of the central roll. The position of the bearings of at least one of the rolls is axially adjustable.

8 Claims, 3 Drawing Figures

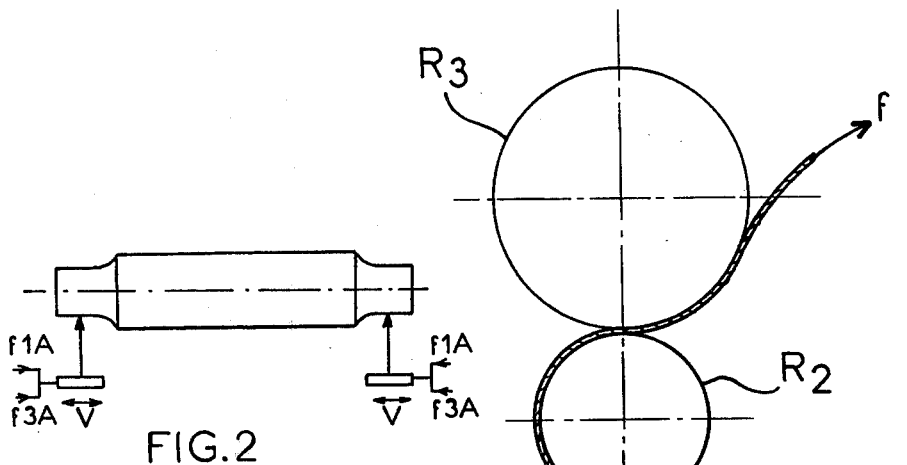
FIG.2
FIG.1
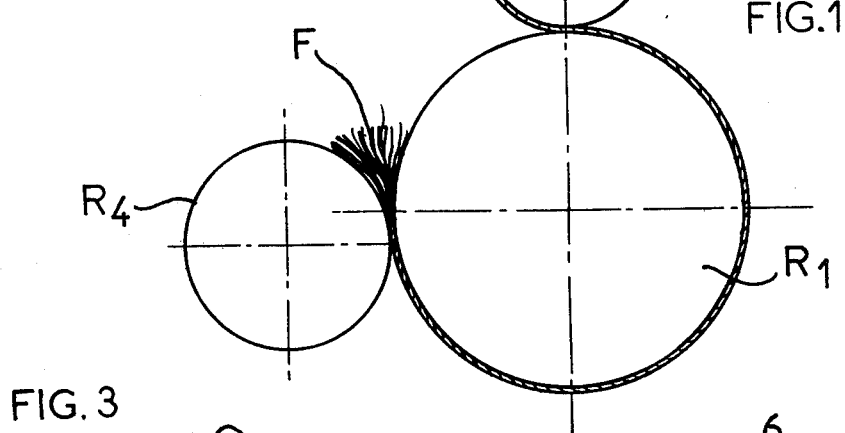
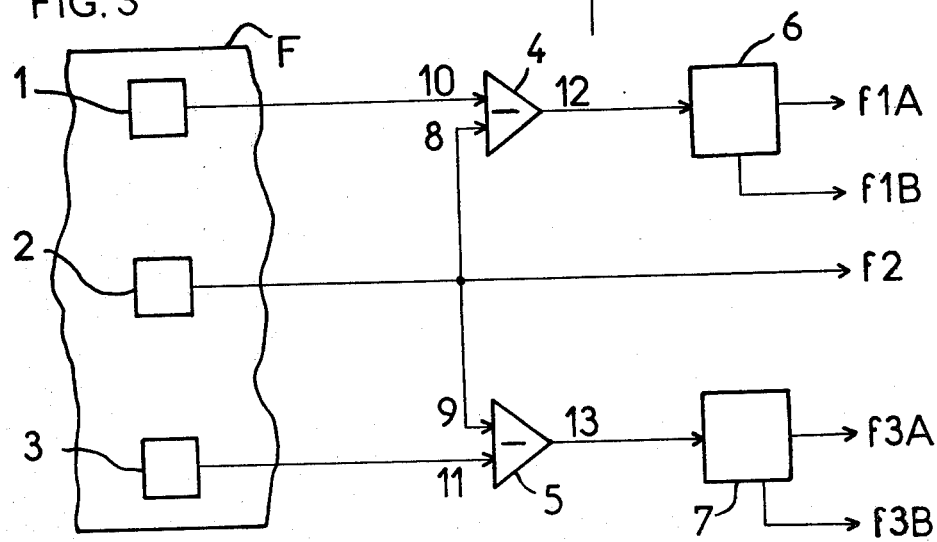
FIG.3

CALENDERING INSTALLATION FOR THERMOPLASTIC SHEETS

FIELD OF THE INVENTION

The present invention relates to a calendering installation for thermoplastic sheets which enables the production of sheets having an identical average thickness at any point of their transverse profile. Their regular winding on a mandrel is then always cylindrical.

DESCRIPTION OF THE PRIOR ART

Fabricator-processors of calendered sheets (in particular thermoplastic sheets) seek increasingly sheets which unroll rectilinearly. Conventional correction means do not enable an adequate degree of precision to be obtained necessary to satisfy this requirement, especially if the sheet is cut into longitudinal strips.

By comparison with the result of rolling materials remaining three-dimensionally fixed through their molecular structure, the manufacturer of viscoelastic sheets delivered in the form of reels poses considerable problems. A review of efforts of ready made in this field enables a better comprehension of the difficulties encountered. It was the iron-smelters, firstly, who were obliged to transform material into a progressively thinner strip, either by successive passages over the same machine composed of two cylinders, or by a single passage over several machines arranged one after the other.

With the discovery of rubber and it became necessary, as for metal, to be able to deliver it in strip form, and not two, but three or four cylinders were grouped in the same machine. The calender derived from the rolling mill was born, and rubber sheet, and then other materials, including plastics materials subsequently discovered, were processed on this type of machine.

In the rolling of metal, however, the necessary uniformity of transverse profile of the sheets was fairly soon found to be possible, since these materials retain their shape after this treatment. Amorphous thermoplastic sheeting, on the other hand, after some time adapts itself to the geometry of its support. Such sheet wound on a mandrel and possessing a difference in thickness between one edge and the other, will unwind in a circular arc since the spool will have taken the shape of a conical frustum. If the thickness variation is not constant, as is the case generally, bosses or corrugations are also inevitably produced, on the sheet unwound.

By way of example of the exigencies of this technique, a polyvinyl chloride based sheet of thickness 0.2 mm, of width 615 mm, of length 200 m, wound on a mandrel of $\phi$ 63 mm, whose deviation over a circular arc does not exceed 2 cm over 8 m of length, should have differences in transverse thickness less than 0.0005 mm.

The irregularity of the transverse profile is due to the forces the materials exert on their passage between the rolls. Under the influence of these forces, the rolls bend and the thickness of the sheet is greater at the middle than at the edges.

The bending of the rolls depends on the parameters connected notably with the length and the diameter of the rolls, as well as with their rigidity and the distance between the supporting points of their axles. To compensate for the irregularity of transverse thickness two methods have been conceived:

Either to displace the axles of the cylinders (skewing or "cross axis") so as to increase the nipping gap at the edges of the rolls, Or to compensate the bending by stresses exerted on the rolls by extensions situated on the outside of their rotation position on the bearings (roll tension or "roll bending").

These various methods enable an improvement in the quality of the sheets produced but they are still very insufficient. In addition, their application is expensive.

It is therefore an object of the invention to provide a calender which produces thermoplastic sheets of more uniform thickness, by simple and effective means.

GENERAL DESCRIPTION OF THE INVENTION

To this end, the calendering installation according to the present invention which comprises at least three active rolls is characterized in that the diameters of the rolls are different, the diameter of the lower roll being greater than the diameter of the each of the two others, the diameter of the upper roll being greater than the diameter of the central roll, in that the rolls are formed of materials having different moduli of elasticity, the modulus of elasticity of the upper roll being greater than that of the central roll, and in that the position of the bearings of at least one of the rolls is axially adjustable.

According to one feature of the invention, the installation comprises radiation gauges serving to control the thickness of the sheets.

It is thus possible to monitor the regularity of thickness of the sheets at any moment.

According to another feature of the invention, the signals coming from thickness gauges are used to control the adjustment of the variable distance between the axles of the rolls.

BRIEF DESCRIPTION OF THE DRAWINGS

Other features and advantages of the present invention will emerge better from the description which follows, given with reference to the accompanying drawings in which:

FIG. 1 shows diagrammatically one embodiment of an installation according to the invention, comprising three rolls;

FIG. 2 shows diagrammatically and on a smaller scale, a roll according to the invention with its means of varying the position of the bearings; and FIG. 3 shows diagrammatically the essential elements of the thickness control device according to the present invention.

DESCRIPTION OF A SPECIFIC EMBODIMENT

The calendering installation according to the present invention comprises a group of three calendering rolls $R_1$, $R_2$ and $R_3$ arranged one above the other, from the bottom to the top, their rotational axle being in the same vertical plane. The axles of the rolls are supported by bearings whose position with respect to the end of the rolls may be adjusted by any suitable means, shown diagrammatically in v in FIG. 2.

The diameter of the lower roll is the greatest This roll is constructed of a material whose coefficient of elasticity is not very critical; if may be, for example, of cast iron. The central roll has a small diameter with respect to that of the lower roll. The ratio between the diameters of rolls $R_1$ and $R_2$ is situated between 1.9 and 2.4. The central roll is preferably of chilled cast iron, that is to say of a material which has a low coefficient of elasticity.

The diameter of the upper roll $R_3$ is situated half way between the two foregoing diameters, so that the ratio between the diameters of the rolls $R_3$ and $R_2$ has a value ranging from 1.45 to 1.80. The roll $R_3$ must have very high rigidity. It is for example made of steel.

The installation comprises also preferably a control device for the thickness of the calendered product. (FIG. 3). These devices comprise, for example, radiation gauges which are located close to the calendered sheet, so as to detect variations in thickness. As is shown in FIG. 2, a gauge 2 is provided which detects at the center of the sheet edge the differences between the actual value and the desired value of the thickness of the sheet.

In the same way, gauges 1 and 3, arranged close to the edges of the sheet, enable, among other functions, the detection of differences between the thickness at the center and the thickness at the edge of the sheet. To this end, signals coming from the central gauge 2 are transmitted, on the one hand, directly to an indicator (see arrow $F_2$), on the other hand, to one of the respective inputs (8,9) of a comparator (4,5) while the other respective inputs (10,11) of the comparators (4,5) receive signals coming from the gauges 1 and 3. The different signals coming from the outputs, 12, 13 of the comparators 4,5 are directed to a respective indicator (6,7) and, from there, to an indicator (see arrows f1A, f3A). It is possible to reset the apparatus to zero (arrows f1B, f3B).

The installation operates in the following manner:

The viscous material (F, FIG. 1) having been applied at the inlet of the machine, for example between the rolls $R_4$ and $R_1$, is drawn by the rotation of the rolls into the nipping gap located between the rolls $R_1$ and $R_2$. As the roll $R_2$ is of cast iron and is of small diameter, it undergoes a considerable bending which is due to the stresses exerted by the material on its passage between the rolls $R_1$ and $R_2$. After passage between $R_1$ and $R_2$, the sheet moves towards the nipping gap $R_2$ and $R_3$ where its presence creates stresses, but of less magnitude, the roll $R_3$ having a smaller diameter than the roll $R_1$. The roll $R_2$ therefore will bend in the same direction as the roll $R_3$. Calculation and experiment show that by varying the diameters of the rolls and the modulus of elasticity of the material which composes them within the indicated limits, that the lower and upper stresses that are exerted on the rolls, notably on $R_2$, have the result that the thickness of the sheet obtained after passage between the rolls $R_2$ and $R_3$ is substantially uniform. After passage between $R_2$ and $R_3$, the sheet is directed to the spooling station (arrow f).

However, as it is hardly possible to adapt the machine once it has been constructed, (by variation of the modulus of elasticity or of the diameters) to very different conditions of use, taking into account notably the speed of operation and the variable thickness of the sheets it is provided, according to the invention, for the positions of the bearings supporting the rolls to be adjustable. This enables a finer correction of the thickness to be effected simply (see means v of FIG. 2).

The thickness control device (FIG. 3) enables by various means, such as a warning system or a servo-coupled system, either to warn the existence of a defect, or to obtain automatic adjustment to the thickness (for example by the action of means v on the distance between the bearings of the axles). This is useful in the course of manufacture and especially, in the course of reeling which takes place immediately after production. If the reeling onto a cylindrical mandrel is carried out abnormally on account of a defect, the subsequent reeling will only be perfect by producing, for some time a sheet having the defect reversed. It is here that the control and servo -coupling device comes into play.

The present invention has only been described and illustrated on the basis of a preferred embodiment and equivalent techniques could be introduced therein without however departing from its scope which is defined in the appended claims.

I claim:
1. Calendering installation for the production of thermplastic sheets comprising:
   at least three active calendering rolls having axis of rotation, located respectively as a lower roll, a central roll and a upper roll;
   bearings adapted to the location of said axles of rotation of said rolls, so that axle are substantially in the same plane;
   said lower roll having a greater diameter than the diameters of said central roll and said upper roll;
   said upper roll having a greater diameter than the diameter of said central roll;
   said upper roll having a greater modulus of elasticity than the modulus of elasticity of the central roll;
   means for axially adjusting the location of said bearings of at least one of said three rolls;
   each of said thermoplastic sheets produced having a uniform thickness.
2. Installation according to claim 1, wherein the ratio between said diameters of said lower and central rolls has a value situated between 1.9 and 2.4.
3. Installation according to claim 1, wherein the ratio between said diameters of said upper and central rolls has a value situated between 1.45 and 1.80.
4. Installation according to claim 1, wherein said upper roll is of steel.
5. Installation according to claim 1, wherein said central roll is of cast iron.
6. Installation according to claim 1, further comprising:
   at least three thickness gauges arranged respectively in the vicinity of the center and at each of the edges of each of said thermoplastic sheets produced.
7. Installation according to claim 1, further comprising:
   three thickness gauges, arranged as a central gauge and two edge gauges;
   said central gauge detecting the difference between the actual thickness at the center of each of said thermoplastic sheets and the desired thickness at said center;
   said edge gauges detecting the difference between the thickness at the edge of each thermoplastic sheet and said thickness at said center.
8. Installation according to claim 1, further comprising:
   at least three thickness gauges, constituted by a central gauge and two edge gauges;
   said central gauge detecting the difference between the actual thickness at the centerof each of said thermoplastic sheets and the desired thickness at the center;

said edge gauges detecting the difference between the thickness at the edge of each of said thermoplastic sheets and the said thickness at the center;

at least two comparators receiving signals from said gauges;

at least two integrators receiving signals from said comparators;

indicators receiving signals from said comparators;

the signals arriving from said indicators serving for the control of said means to adjust the location axially of said bearings.

* * * * *